US008474017B2

(12) United States Patent
Schultz et al.

(10) Patent No.: US 8,474,017 B2
(45) Date of Patent: Jun. 25, 2013

(54) IDENTITY MANAGEMENT AND SINGLE SIGN-ON IN A HETEROGENEOUS COMPOSITE SERVICE SCENARIO

(75) Inventors: Paul T. Schultz, Colorado Springs, CO (US); Mark J. Hahn, Stow, MA (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 502 days.

(21) Appl. No.: 12/842,227

(22) Filed: Jul. 23, 2010

(65) Prior Publication Data
US 2012/0023556 A1 Jan. 26, 2012

(51) Int. Cl.
*H04L 29/06* (2006.01)

(52) U.S. Cl.
USPC .................................................. 726/4; 726/8

(58) Field of Classification Search
USPC .................................................. 726/4, 5, 8, 9
See application file for complete search history.

(56) References Cited

U.S. PATENT DOCUMENTS

| | | | |
|---|---|---|---|
| 7,913,298 B2* | 3/2011 | Bhatia et al. ....................... | 726/8 |
| 2006/0129816 A1* | 6/2006 | Hinton ........................... | 713/169 |
| 2007/0186106 A1* | 8/2007 | Ting et al. ...................... | 713/168 |
| 2011/0016534 A1* | 1/2011 | Jakobsson et al. .............. | 726/28 |
| 2011/0072496 A1* | 3/2011 | Bertin et al. ....................... | 726/4 |
| 2011/0202989 A1* | 8/2011 | Otranen et al. ................... | 726/8 |
| 2011/0209202 A1* | 8/2011 | Otranen ............................. | 726/4 |
| 2011/0225637 A1* | 9/2011 | Counterman ...................... | 726/7 |
| 2011/0287739 A1* | 11/2011 | Cajigas Bringas et al. .... | 455/410 |
| 2011/0314533 A1* | 12/2011 | Austin et al. ....................... | 726/9 |
| 2011/0314549 A1* | 12/2011 | Song et al. ....................... | 726/25 |

OTHER PUBLICATIONS

Schiffman, Joshua et al.; DAuth: Fine-granined Authorization Delegation for Distributed Web Application Consumers, Jul. 21-23, 2010; 2010 IEEE Internation Symposium on Policies for Distrubted Systems and Networks; pp. 95-102.*
Saroiu, Stefan et al.; Enabling New Mobile Applications with Location Proofs; Feb. 23-24, 2009; HotMobile 2009.*
Wikipedia, "OpenID", http://en.wikipedia.org/wiki/OpenID, Jun. 1, 2010, 11 pages.
Wikipedia, "OAuth", http://en.wikipedia.org/wiki.OAuth, Oct. 5, 2010, 3 pages.

* cited by examiner

*Primary Examiner* — Jeffrey Pwu
*Assistant Examiner* — William Corum, Jr.

(57) ABSTRACT

A server device that includes a memory to store identity information for a group of users, policy information, and context information for a group user devices. The server device also includes a processor to receive, from another server device, a request for login credentials, associated with a user of a user device, that enable a third party application to access a service provider on behalf of the user, the request including identity information associated with the user and context information associated with the user device; verify the identity of the user based on a determination that particular identity information is stored in the memory; authorize the disclosure of the particular identity information based on a determination that the context information matches particular context information stored in the memory and that the policy information permits the disclosure of the particular identity information; and send the particular identity information, that includes the login credentials, to the other server device based on the verified identity and the authorized disclosure.

24 Claims, 6 Drawing Sheets

IDENTITY MANAGEMENT AND SINGLE SIGN-ON IN A HETEROGENEOUS COMPOSITE SERVICE SCENARIO

BACKGROUND

Today's user devices are capable of using applications that provide an ever-increasing variety of services that continue to improve the user's experience. Many of today's applications are capable of communicating with other applications (e.g., service provider applications) hosted by service provider networks and/or other networks (e.g., the Internet). Furthermore, many of today's applications can combine an array of services and/or information, obtained from the service provider applications, into a composite service (e.g., sometimes referred to as a "mashup") to be presented to a user of a user device.

Sometimes it is difficult, however, to obtain the array of services and/or information from the service provider applications due to unique login procedures and/or different login credentials used by the service provider applications. Furthermore, the user of the user device (e.g., associated with an application from which the composite service is being received) is not always known to the service provider networks and/or the service provider applications providing a service to the application. Consequently, service provider networks and/or the service provider applications may risk exposing information to the unknown user that the unknown user is not authorized to receive.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may include systems and/or methods that provide for identity management and single sign-on in a heterogeneous composite service scenario. As described herein, the identity management (IDM) and single sign-on (SSO) implementation may use an IDM/SSO application to perform an operation to register a third party application. The term, "third party application," as described herein, may be an application that is hosted by a server device associated with a particular network (e.g., the Internet) that is different than a network with which the IDM/SSO application is associated. As also described herein, the IDM/SSO application may provide IDM and/or SSO services for the third party application, on behalf of a user of a user device that may not be known to the IDM/SSO application (hereinafter referred to as an "unknown user").

The term, "heterogeneous composite service," as described herein may include a collection of services that originate from different networks (e.g., sometimes referred to as "heterogeneous networks"), which are received by a third party application and presented to an unknown user of a user device as a single and/or combined service (e.g., a composite service). For example, a third party application may request to receive a particular service (e.g., on behalf of an unknown user) from a service provider network with which the IDM/SSO application is associated. Additionally, the third party application may request to receive (e.g., on behalf of the unknown user) another service from another network (e.g., the Internet) and may present, to the user device, the particular service and the other service as a heterogeneous composite service (hereinafter referred to as a "composite service"). In one example, a composite service may enable an unknown user to schedule an appointment with a user whenever the user visits a particular city. The third party application may provide the composite service to the unknown user by accessing a calendar associated with the user (e.g., via a calendar service associated with a particular network) to determine the availability of the user when the user is located in the particular city (e.g., via a location service associated with another network). Additionally, the unknown user may desire to invite colleagues associated with the user and may do so by accessing an address book associated with the user (e.g., via an address book service associated with yet another network).

In one example implementation, an IDM/SSO application may perform an operation to register a third party application. For example, the IDM/SSO application may receive a registration request from a third party application, may register the third party application, and/or may send login credentials to the third party application.

In another example implementation, an IDM/SSO application may provide IDM services to the registered third party application that include verifying the identity of an unknown user (e.g., of a user device) associated with a third party application. For example, the IDM/SSO application may receive a request for IDM services from a third party application to verify an identity associated with the unknown user with which the third party application is associated. The request may include identity information (e.g., such as a token) that contains information associated with the unknown user, the user device, an application associated with the user device, etc. The IDM/SSO application may receive the request and may use the token to obtain other identity information (e.g., from an IDM/SSO database), permission information (e.g., associated with an application that provides a service to the third party application), policy information (e.g., associated with a service provider network), and/or context information (e.g., associated with the user device) that may be used to verify the identity of the user. As described herein, the term "service provider application" may include an application that provides a service to the third party application and is sometimes referred to as a "capability provider," an "enabler," a "heterogeneous enabler," and/or an "enabling service").

In yet another example implementation, the IDM application may provide SSO services to a third party application. For example, the IDM/SSO application may verify the identity of a user of a user device, as described above, and may retrieve identify information and/or login credentials (e.g., associated with the unknown user, and/or the user device) for each service provider application. The IDM/SSO application may send the login credentials to the third party application that enables the third party application to login to the service provider applications on behalf of the unknown user. The third party application may use the services, obtained from the service provider applications, to provide a composite service to the unknown user via the user device.

Figure 1:
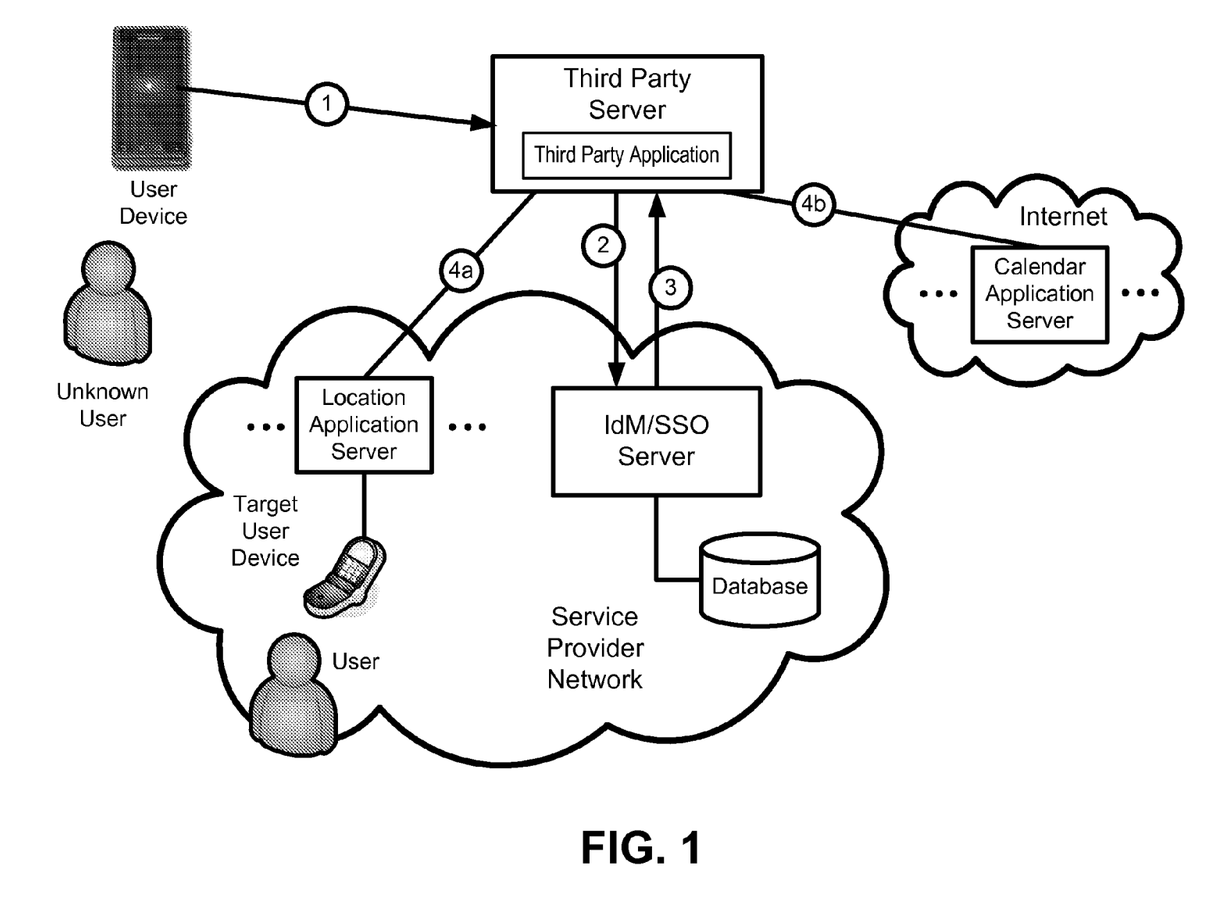
FIG. 1 is a diagram that illustrates an overview of an identity management and single sign-on implementation in a heterogeneous composite service scenario described herein.

FIG. 1 is a diagram that illustrates an overview of an IDM and SSO implementation in a heterogeneous composite service scenario described herein. As illustrated in FIG. 1, a third party server may host a third party application (e.g., "Personal Assistant"—not shown in FIG. 1) that may provide a composite service to a user associated with a user device, that is unknown (e.g., shown as "unknown user") to an IDM/SSO application hosted on an IDM/SSO server. The third party server may, for example, use the third party application to provide a composite service (e.g., a personal assistant service) to the user device based on heterogeneous services (e.g., a location service, a calendar service, and/or other services). The location service may, for example, be obtained from a service provider application (e.g., a location application) that is hosted by a location application server associated with a service provider network. The calendar service may, for example, be obtained from another service provider application (e.g., a calendar application) that is hosted by a calendar application server associated with another network (e.g., the Internet).

Assume, in this example, that the unknown user desires to use a composite service (e.g., the personal assistant service provided by the third party application) to set up an appointment with a user of a target user device associated with the service provider network. Assume further that the third party application desires to access a calendar service to identify when the user is available. Assume still further that the third party application desires to access the location service to obtain location information, associated with the target user device, which the third party application will use to set up an appointment and/or to perform some other acts when the target user device is at a particular location.

As shown in FIG. 1, for example, the user device may log into the third party server in order to use the third party application by sending, as indication 1, a token to the third party application. The token may include login credentials that enable the third party application to authenticate the unknown user, the user device, and/or an application on the user device. In another example, the unknown user may provide login credentials by entering the login credentials via a keypad/keyboard, a touch screen, a biometric device, and/or some other device associated with the user device. The biometric device may include a device (e.g., a camera, a laser scanner, a microphone, etc.) that may receive biometric information associated with an unknown user (e.g., retina scans, a voice signature, a facial signatures, fingerprints, etc.), As also shown in FIG. 1, the third party application may communicate with the IDM/SSO server to verify the identity of the unknown user. For example, the third party application may send, as indication 2, all or a portion of the login credentials, received from the user device, to the IDM/SSO server. In one example, the third party application may send the token to the IDM/SSO server. The IDM/SSO server may receive the login credentials associated with the user (e.g., the token) and the IDM/SSO application may authenticate the third party application. Additionally, or alternatively, the IDM/SSO application may, for example, use the token to retrieve, from a database, identity information associated with the unknown user (e.g., information associated with names, addresses, applications with which the user is associated, and/or login credentials associated with the applications with which the user is associated, etc.).

In another example, the IDM/SSO application may retrieve permission and/or policy information associated with the service provider network and/or with a user of the target device. For example, the IDM/SSO application may determine whether the service provider network permits and/or whether the user authorizes the disclosure of particular information (e.g., location information associated with the target user device). In yet another example, the IDM/SSO application may retrieve context information associated with the unknown user and/or the user device. In one example, the context information may include a location associated with the user device from which the user device, at a prior point in time, has accessed the third party application and/or other applications from which heterogeneous services were obtained. The IDM/SSO application may compare the retrieved context information with the context information associated with a current session (e.g., received via the token) to determine whether to verify the identity of the unknown user.

In yet another example, the IDM/SSO application may query the user device to obtain additional identity information and/or log in credentials if the IDM/SSO is unable to verify the identity of the unknown user and/or to authorize disclosure of information based policy and/or permission information, and/or context information.

As further shown in FIG. 1, the IDM/SSO application may send identity information to the third party application. For example, the IDM/SSO application may send, as indication 3, identity information to the third party application. The identity information may include login credentials for the unknown user and/or the user device that may be used by the third party application to access all or a portion of the heterogeneous service providers (e.g., the location application and/or the calendar application).

As still further shown in FIG. 1, the third party application may obtain services from the heterogeneous service providers. For example, third party application may receive the identity information from the IDM/SSO application and may send, as indication 4a, login credentials to the location application server. In another example, the third party application may send, as indication 4b, other login credentials to the calendar application server.

In another example implementation, the IDM/SSO server may receive a query from a heterogeneous service provider (e.g., the calendar application server) for another (e.g., an independent) identity verification and/or to obtain additional identity information associated with the unknown user. In one example, the IDM/SSO server may be an OpenID service provider that uses an OpenID® decentralized authentication standard to authenticate the unknown user based on an OpenID® identifier, associated with the unknown user, received via the query). In another example, the IDM/SSO server may communicate with another server associated with an OpenID service provided to receive the independent identify verification.

Figure 2:
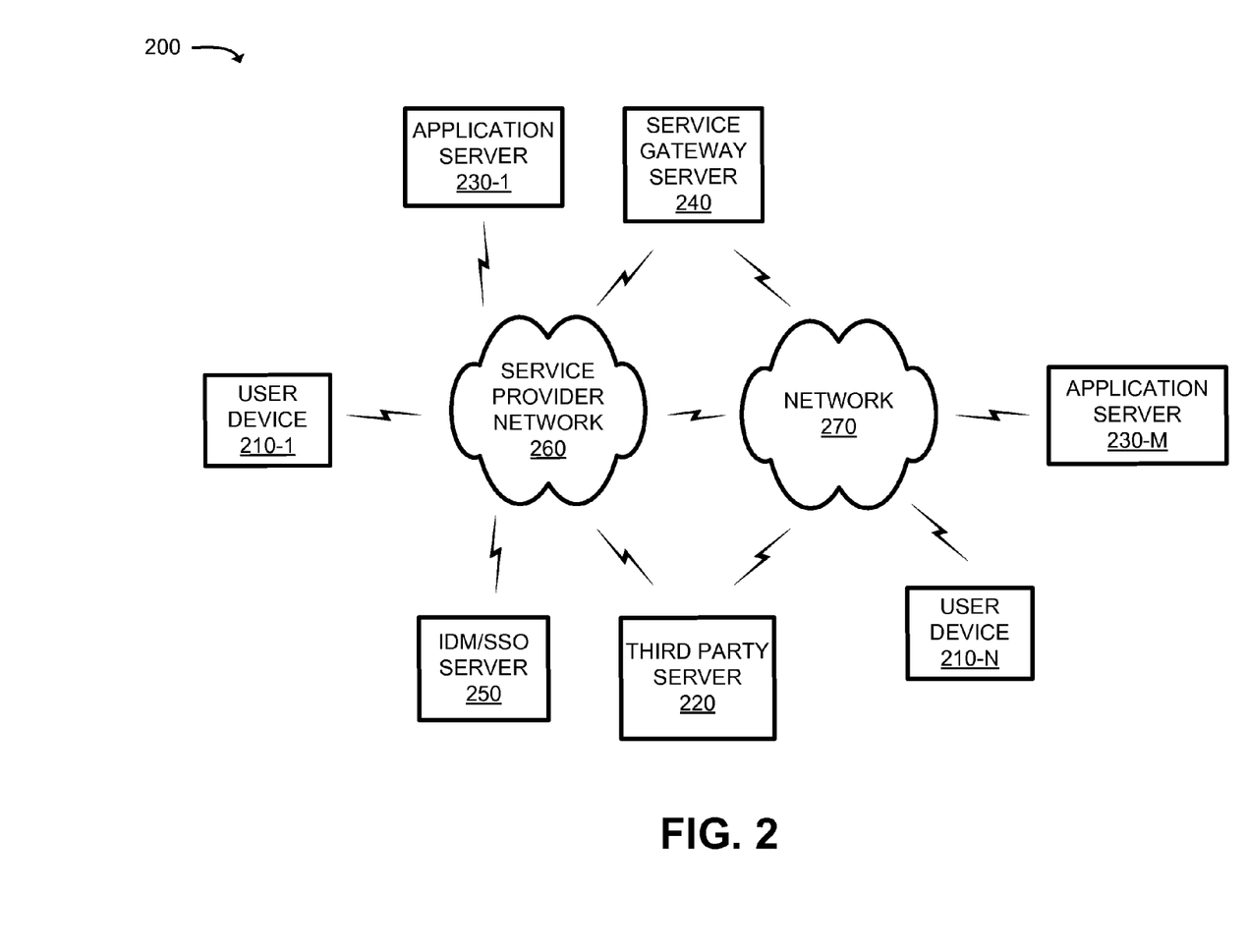
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a group of user devices 210-1, ..., 210-N (N≧1) (hereinafter referred to collectively as "user devices 210" and individually as a "user device 210"), a third party server 220, a group of application servers 230-1, ... 230-M (M≧1) (hereinafter referred to collectively as "application servers 230" and individually as an "application server 230"), a service gateway server 240, an IDM/SSO server 250, a service provider network 260, and a network 270. The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2.

Also, in some implementations, one or more of the devices of network 200 may perform one or more functions described as being performed by another one or more of the devices of network 200. Devices of network 200 may interconnect via wired connections, wireless connections, or a combination of wired and wireless connections.

User device 210 may include any computation or communication device, such as a wireless mobile communication device that is capable of communicating via service provider network 260 and/or network 270. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a landline telephone, a laptop computer, a tablet computer, a personal computer, a set top box (STB), a television, a camera, a personal gaming system, or another type of computation or communication device. The description to follow will generally refer to user device 210 as a wireless mobile device. The description is not limited, however, to a wireless mobile device and may equally apply to other types of user devices.

User device 210-1 may receive services via and/or be a subscriber to service provider network 260. For example, user device 210-1 may communicate with application server 230-1 and/or with application server 230-M (e.g., via service gateway server 240) to establish permissions associated with a particular service. In one example, a user of user device 210-1 may communicate with a service provider application (e.g., associated with a location service) that is hosted by application server 230-1 and may authorize the sharing of information (e.g., location information), associated with user device 210-1, with other user devices 210. Additionally, or alternatively, the user may specify certain conditions under which the sharing may be performed, such as during a specified period of time (e.g., during business hours, Monday through Friday, etc.), a quantity of times per another specified period of time, particular users and/or user devices with whom the location information can be shared, etc. In another example, user device 210-1 may communicate with service provider network 260 to provide context information associated with user device 210-1, such as location information, calendar information, information associated with user device 210-1 (e.g., identifiers described above in FIG. 1, information associated with device type, etc.), information associated with usage patterns (e.g., applications used, frequently visited locations, calendar information, etc.).

User device 210-N may use a third party application to obtain services. For example, user device 210-N may communicate with third party server 220 to obtain services (e.g., heterogeneous composite services and/or other services) from a third party application that is hosted by third party server 220. User device 210-N may, for example, send a request to third party server 220 (e.g., to receive services from the third party application) that includes login credentials as described above in FIG. 1 (e.g., via a token, a keyboard/keypad, and/or some other device associated with user device 210-N). User device 210-N may communicate with the third party application to receive and/or utilized services.

Third party server 220 may include one or more server devices, or other types of computation or communication devices, that gather, process, search, store, and/or provide information in a manner similar to that described herein. For example, third party server 220 may include a server device that hosts a third party application that provides services (e.g., composite services) to user device 210-N. For example, the third party application may obtain services from service provider applications (e.g., hosted by application servers 230), may combine the services obtained from the service provider applications into a composite service, and/or may present the composite service to user device 210-N.

Third party server 220 may communicate with IDM/SSO server 250 to obtain IDM and/or SSO services. For example, third party server 220 may send a token and/or login credentials (e.g., received from user device 210-N), contained in the token, to IDM/SSO server 250 to verify the identity of an unknown user, to authenticate user device 210, and/or to obtain login credentials for service provider applications. The third party application may send the login credentials, on behalf of the user, to service provider applications to obtain services to be used in the composite service provided to user device 210-N.

Application server 230 may include one or more server devices, or other types of computation or communication devices, that gather, process, search, store, and/or provide information in a manner similar to that described herein. For example, application server 230 may host a service provider application that provides a service that may be used by user device 210-N and/or a third party application associated with third party server 220. In one example, application server 230 may, in response to a request for services from a third party application, perform an operation to authenticate an unknown user and/or user device 210-N and may provide a service to third party server 220 based on the authentication operation. In another example, application server 230 may receive the request and may query IDM/SSO server 250 to verify the identity of the unknown user and/or user device 210-N. The query may be performed, for example, when a service provider application, hosted by application server 230, provides a service that uses information of a sensitive nature (e.g., privacy information associated with a user of another user device 210, billing information, electronic medical record information, etc.).

Application server 230-M may obtain information associated with another user device 210. For example, application server 230-M may communicate with user device 210-1 to obtain information to be used in a service to be provided by an application (e.g., a calendar application, an address book application, and/or other applications) hosted by application server 230-M.

Service gateway server 240 may include one or more server devices, or other types of computation or communication devices, that gather, process, search, store, and/or provide information in a manner similar to that described herein. For example, service gateway server 240 may receive a request for services from a third party application (e.g., hosted by third party server 220) and may communicate with application server 230-1 to obtain information and/or services from a service provider application associated with user device 210-1. Service gateway server 240 may, for example, send the received information and/or services to a third party application (e.g., hosted by third party server 220) based on an authorization by IDM/SSO server 250 and/or when authenticated by service gateway server 240.

IDM/SSO server 250 may include one or more server devices, or other types of computation or communication devices, that gather, process, search, store, and/or provide information in a manner similar to that described herein. For example, IDM/SSO server 250 may host an IDM/SSO application that performs an IDM operation to verify the identity of an unknown user (e.g., of user device 210-N) and/or information associated with user device 210-N. In another example, IDM/SSO server 250 may authorize the disclosure of identity information and/or login credentials that permit a third party application to access application server 230, on behalf of the unknown user.

IDM/SSO server 250 may verify an identity of an unknown user and/or information associated with user device 210-N. For example, IDM/SSO server 250 may receive a request to verify the identity of an unknown user and/or information associated with user device 210-N. In response to the request, the IDM/SSO application may retrieve information associated with the unknown user and/or with user device 210-N from a database (e.g., an IDM/SSO database associated with IDM/SSO server 250). Information associated with the unknown user may include information associated with a business identity (e.g., usernames, passwords, business address, particular service provider applications, etc.); a personal identity (e.g., usernames, passwords, personal identification numbers (PINs), home address, home telephone, other service provider applications, etc.), and/or other identities, such as an obfuscated and/or anonymous identity (e.g., a username, password, IP multimedia subsystem (IMS) public user identity, etc.).

In another example, information associated with user device 210-N may include (e.g., device identifiers, such as a mobile directory number (MDN), a landline directory number (LDN), an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), a media access control (MAC) address, an IP address, a uniform resource locator (URL), an encoder-decoder (CODEC) number, a STB identifier, etc.).

In another example, IDM/SSO server 250 may determine whether policy and/or permission information authorizes identity information to be released and/or service provider applications to be accessed. IDM/SSO server 250 may, for example, retrieve policy information, associated with service provider network 260, from a database (e.g., a database associated with IDM/SSO server 250) to determine whether the policy information permits IDM/SSO server 250 to send the identity information to the third party server 220. Additionally, or alternatively, IDM/SSO server 250 may determine whether and/or under what conditions the user authorizes (e.g., based on the permission information) the release of the identity information to the third party server 220.

In yet another example, IDM/SSO server 250 may determine whether to authorize the release of the identity information to the third party application based on context information. IDM/SSO server 250 may, for example, retrieve context information (e.g., from a database associated with IDM/SSO server 250) associated with user device 210-N and may use the context information to determine whether to authorize the release of identity information to the third party application.

IDM/SSO application server 250 may query user device 210-N to verify and/or obtain additional identity information. For example, IDM/SSO application server 250 may receive a token from a third party application and the IDM/SSO application may determine that the identity information contained in the token, is insufficient (e.g., does not match identity information stored in the IDM/SSO database). In another example, the IDM/SSO application may determine that the identity information is insufficient for a service provider application (e.g., a particular service provider application that handles sensitive information and/or has unique access requirements). Based on the determination, the IDM/SSO application may, for example, send a query to user device 210-N to obtain additional identity information associated with an unknown user, an application, and/or user device 210-N.

Service provider network 260 may include one or more wired and/or wireless networks via which IDM/SSO services are provided. For example, service provider network 260 may include a cellular network, the Public Land Mobile Network (PLMN), a second generation (2G) network, a third generation (3G) network, a fourth generation (4G) network, a fifth generation (5G) network, and/or another network. Additionally, or alternatively, service provider network 260 may include a wide area network (WAN), a metropolitan area network (MAN), an ad hoc network, an intranet, a fiber optic-based network (e.g., a fiber optic service (FiOS) network), and/or a combination of these or other types of networks.

Network 270 may include one or more wired and/or wireless networks. For example, network 270 may include a cellular network, the PLMN, a 2G network, a 3G network, a 4G network, a 5G network, and/or another network. Additionally, or alternatively, network 270 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks.

Figure 3:
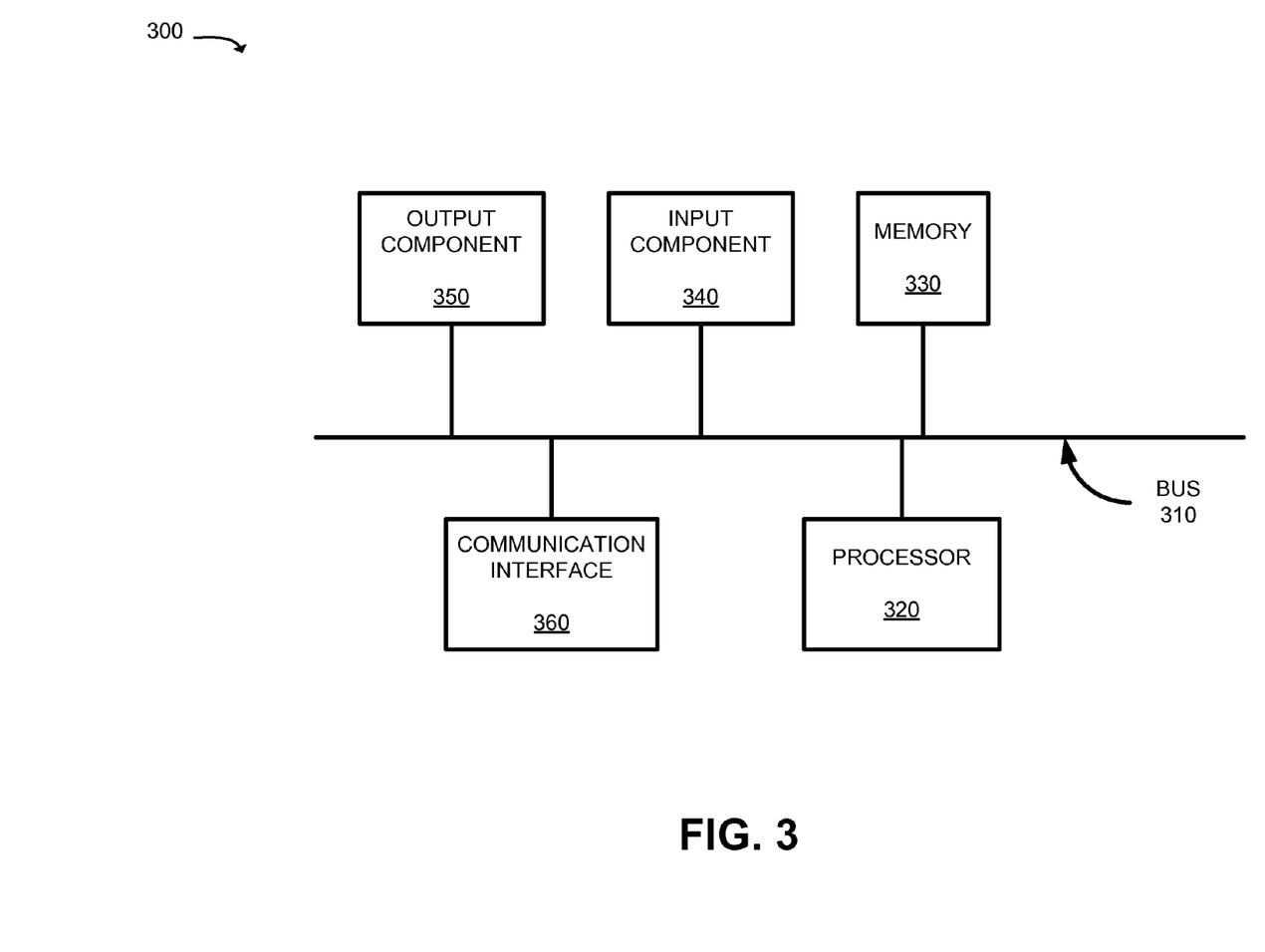
FIG. 3 is a diagram of example components of one or more of the devices of FIG. 2.

FIG. 3 is a diagram of example components of a device 300. Device 300 may correspond to user device 210, third party server 220, application server 230, service gateway server 240, and/or IDM/SSO server 250. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, a microphone, a camera, a fingerprint reader, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 260 and/or network 270.

As will be described in detail below, device 300 may perform certain operations relating to IDM and/or SSO services associated with heterogeneous composite services. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
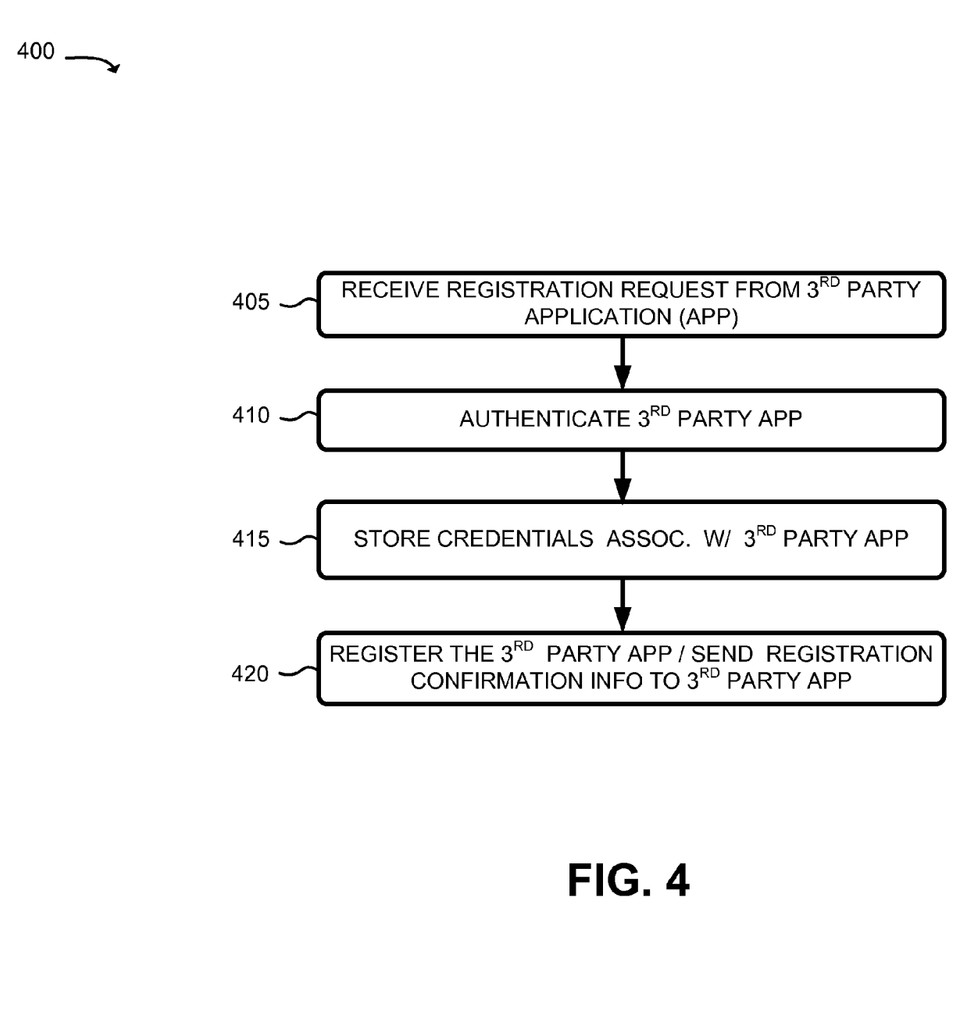
FIG. 4 is a flowchart of an example process for registering a third party application.

FIG. 4 is a flowchart of an example process 400 for registering a third party application. In one implementation, process 400 may be performed by IDM/SSO server 250. In another implementation, some or all of process 400 may be performed by a device or collection of devices separate from, or in combination with, IDM/SSO server 250. For example, service gateway server 240 and/or IDM/SSO server 250 could be combined into a single device.

As shown in FIG. 4, process 400 may include receiving a registration request from a third party application and the third party application may be authenticated (block 405). For example, IDM/SSO server 250 may receive a request, from third party server 220, to register a third party application with the IDM/SSO application hosted on IDM/SSO server 250. The request may include information associated with the third party application (e.g., an application identifier) and/or information associated with third party server 220 (e.g., a device identifier, an IP address, a MAC address, a URL, etc.). In another example, the request may include information associated with service provider applications (e.g., hosted by application servers 230) from which services may be obtained by the third party application.

As also shown in FIG. 4, process 400 may include authenticating the third party application (block 410). For example, the IDM/SSO application may compare the received information associated with the third party application (e.g., and/or information associated with third party server 220) with information associated with third party applications (e.g., and/or information associated with third party server 220) stored in a memory (e.g., a memory associated with IDM/SSO server 250).

In one example, the IDM/SSO application may determine that the received information associated with the third party application does not match the stored information associated with the third party application. The IDM/SSO application may, based on the determination, deny registration to the third party application.

As further shown in FIG. 4, process 400 may include storing credentials associated with the third party application (block 415). For example, the IDM/SSO application may determine that the received information, associated with the third party application, matches the stored information associated with third party application. Based on the determination, the IDM/SSO application may store, in the memory, the received information associated with the third party application, information associated with third party server 220, and/or information associated with service provider applications (e.g., hosted by application servers 230) from which services are to be obtained by the third party application.

As yet further shown in FIG. 4, process 400 may include registering the third party application and sending registration confirmation information to the third party application (block 420). For example, the IDM/SSO application may register the third party application by generating confirmation information that includes application-layer login credentials associated with the third party application. The IDM/SSO application may send the confirmation information to the third party application to be used to log in to the IDM/SSO application during an IDM/SSO session.

Figure 5:
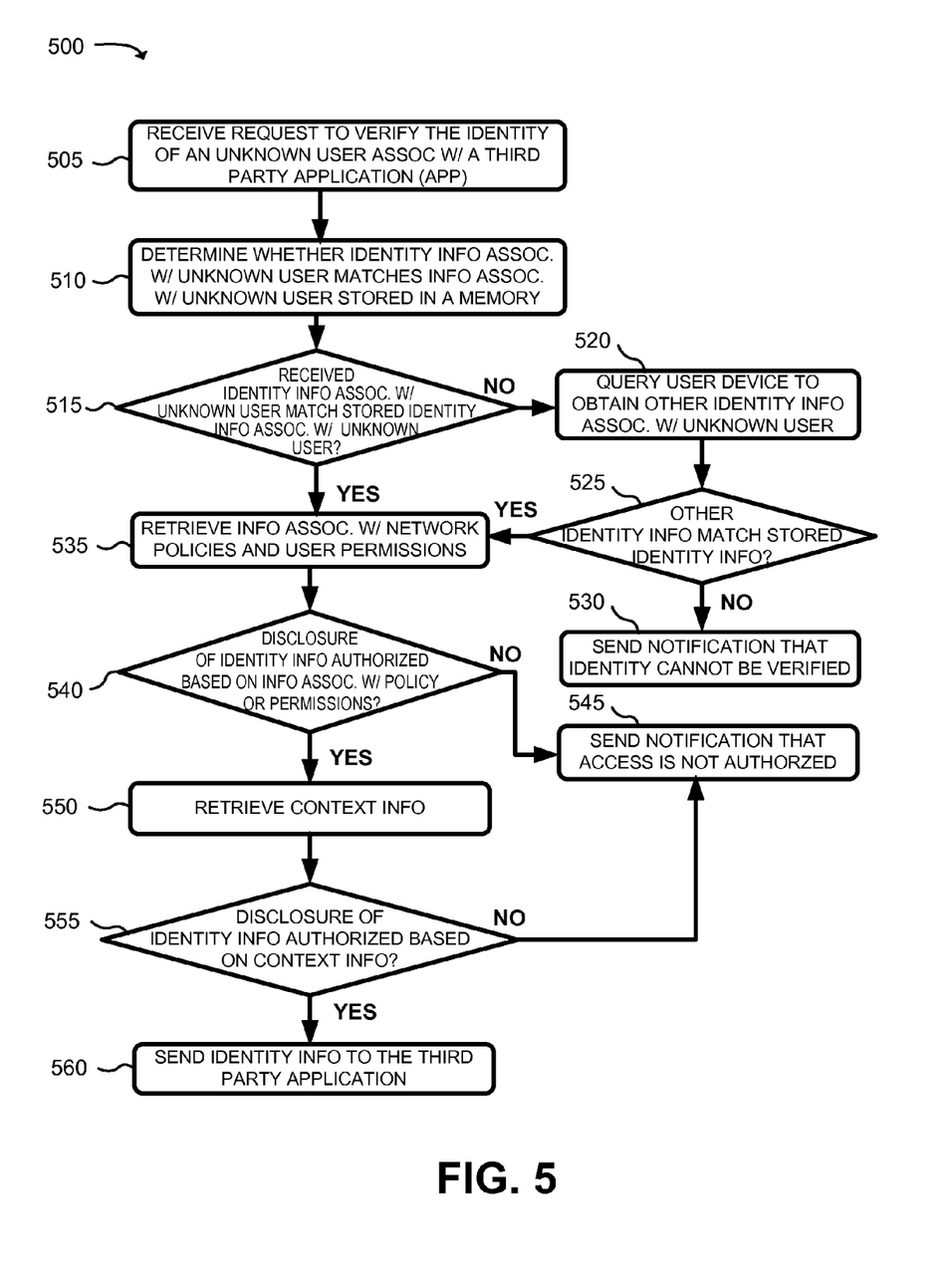
FIG. 5 is a flowchart of an example process for verifying a user identity and providing heterogeneous composite service single sign-on credentials to a third party application.
Figure 6A:
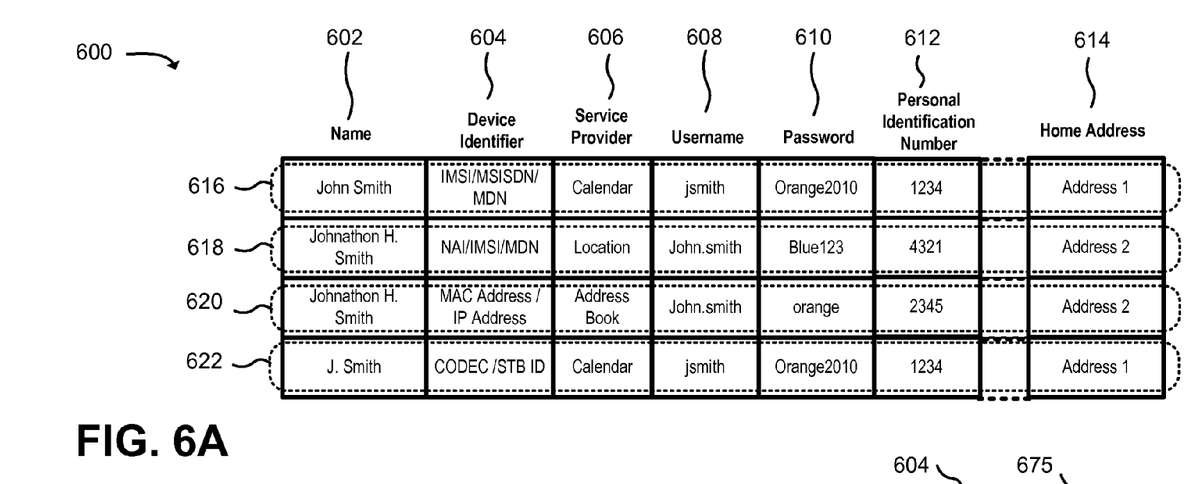
FIGS. 6A-6C are diagrams of example identity management and single sign-on data structures.
Figure 6B:
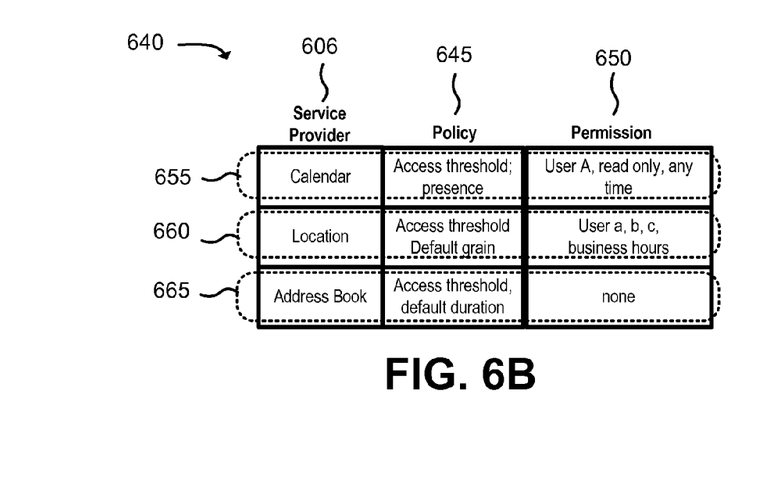
Figure 6C:
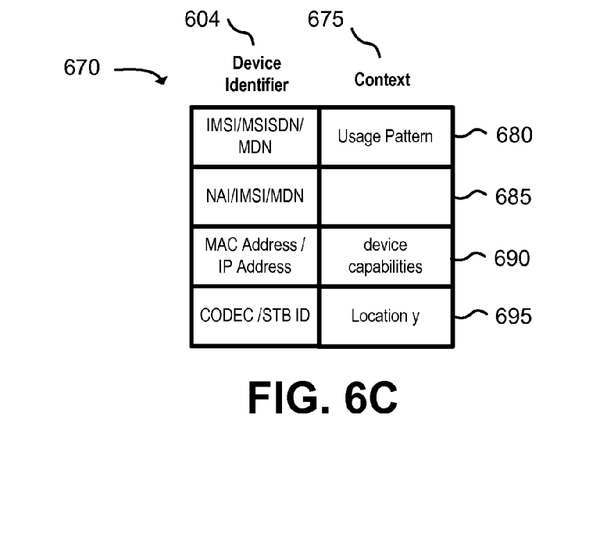

FIG. 5 is a flowchart of an example process 500 for verifying a user identity and/or for providing heterogeneous composite service single sign-on credentials for a third party application. In one implementation, process 500 may be performed by IDM/SSO server 250. In another implementation, some or all of process 500 may be performed by a device or collection of devices separate from, or in combination with, IDM/SSO server 250. FIGS. 6A-6C are diagrams of example IDM/SSO data structures 600-670. A portion of process 500, of FIG. 5, will be discussed below with corresponding references to example IDM/SSO data structures 600-670 shown in FIGS. 6A-6C.

As shown in FIG. 5, process 500 may include receiving a request to verify the identity of an unknown user associated with a third party application (block 505). Assume that a user, of user device 210-N, is associated with a third party application. Assume further that the user is unknown (hereinafter referred to as "unknown user") to an IDM/SSO application hosted by IDM/SSO server 250. Assume yet further that the unknown user desires to establish a session with the third party application via which services may be received. For example, the unknown user may send a request to third party server 220 to receive services from the third party application that is hosted by third party server 220. The request may include a token that contains identity information associated with the unknown user (e.g., username, password, PIN, etc.) and/or information associated with user device 210-N (e.g., a device identifier as described above with respect to FIG. 2), and/or information associated with an application (e.g., an application identifier) stored on user device 210-N. Third party server 220 may receive the request and the third party application may send another request, to IDM/SSO server 250, to obtain IDM and/or SSO services regarding the session associated with the unknown user. The other request may include the token and/or registration confirmation information obtained as a result of a registration operation as described above (e.g., with respect to process 400 of FIG. 4). In another example, the request may include particular service provider applications (e.g., hosted by application servers 230) which access is being sought by the third party application.

As also shown in FIG. 5, process 500 may include determining whether identity information associated with an unknown user matches identity information associated with an unknown user stored in a memory (block 510). For example, IDM/SSO server 250 may receive the other request and the IDM/SSO application may perform an application-layer authentication operation on the third party application by comparing the received registration confirmation information with registration confirmation information stored in a memory. The IDM/SSO application may authenticate the third party application based on a determination that the received registration confirmation information matches the registration confirmation information stored in a memory.

Additionally, or alternatively, the IDM/SSO application may use the token to determine whether identity information, associated with the unknown user, is stored in a memory (e.g., an IDM/SSO data structure 600 of FIG. 6A). For example, as illustrated in FIG. 6A, IDM/SSO data structure 600 may include a collection of fields, such as a name field 602, a device identifier field 604, a service provider field 606, a username field 608, a password field 610, a personal identification number (PIN) field 612, a home address field 614, and/or other fields not shown in FIG. 6A (e.g., other fields associated with a telephone number, a shipping address, an alias, a legal name, confidential information, such social security number, credit card information, security questions, etc., and/or other information). IDM/SSO data structure 600, of FIG. 6A, includes fields 602-614 for explanatory purposes. In practice, IDM/SSO data structure 600, of FIG. 6A, may include additional fields, fewer fields, different fields, and/or differently arranged fields than are described with respect to IDM/SSO data structure 600 of FIG. 6A.

Name field 602 may include a name corresponding to a particular identity associated with the unknown user of user device 210-N. For example, a name may correspond to a business identity, a personal identity and/or other identities associated with the unknown user. In another example, the name may correspond to an identity that the unknown user uses for a particular application. In yet another example, a name may correspond to an identity that the unknown user uses to obfuscate all or a portion of other identification information associated with the unknown user (e.g., legal name, home address, telephone number, etc.). Device identifier field 604 may include information associated with a device identifier that corresponds to user device 210-N associated with the unknown user, such as a computer, a STB, a cell phone a PDA, etc.

Service provider field 606 may include information associated with a particular service provider application (e.g., hosted by application server 230) from which services are obtained by the unknown user and/or by a third party application on behalf of the unknown user. Username field 608 may include a username associated with the particular service provider application that the unknown user and/or the third party application may use when logging into the particular service provider application to receive a particular service. Password field 610 may include a password associated with the particular service provider application that the unknown user and/or the third party application may use when logging into the particular service provider application to receive the particular service. PIN field 612 may include a PIN associated with the particular service provider application that the unknown user and/or the third party application may use when logging into the particular service provider application to receive a particular service. Home address field 614 may include a home address associated with the unknown user.

Returning to FIG. 5, the IDM/SSO application may, for example, compare the identity information obtained from the token with identity information stored in IDM/SSO data structure 600, to determine whether the identity information stored in the token matches the identity information stored in IDM/SSO data structure 600 (block 515). More particularly, the IDM/SSO application may compare the identity information obtained from the token with the information stored in IDM/SSO data structure 600, as shown by ellipse 616, that includes information associated with the unknown user, such as a name (e.g., John Smith), a username (e.g., jsmith), a password (e.g., Orange2010), a PIN (e.g., 1234), a home address (e.g., address 1), and/or other information associated with the unknown user. Additionally, or alternatively, the information stored in IDM/SSO data structure 600 may include information associated with user device 210-N, such as a device identifier (e.g., IMSI/MSISDN/MDN, etc.) and/or information associated and a service provider application from which services may be obtained, such as a service provider identifier (e.g., calendar), as shown by ellipse 616. Additionally, or alternatively, the IDM/SSO application may compare the identity information obtained from the token with other identity information stored in IDM/SSO data structure 600 (e.g., shown as ellipses 618-622) to determine whether the identity information obtained from the token matches the identity information stored in IDM/SSO data structure 600.

As further shown in FIG. 5, if received identity information associated with an unknown user does not match stored identity information associated with an unknown user (block 515—NO) then process 500 may include querying a user device to obtain other identity information associated with an unknown user (block 520). For example, the IDM/SSO application may compare identity information stored in the token with identity information stored in the memory and may determine that the identity information stored in the token does not match the identity information stored in the memory. The IDM/SSO application may, for example, query user device 210-N to obtain other identity information associated with the unknown user and/or user device 210-N.

In another example, the IDM/SSO application may determine that the identity information stored in the token does not permit the IDM/SSO application to verify the identity of the unknown user with respect to a particular service provider application (e.g., associated with application server 230) from which services are to be obtained by the third party application. The IDM/SSO application may, for example, query user device 210-N to obtain other identity information from the unknown user that permits the IDM/SSO application to verify the identity with respect to the particular application. In one example, the IDM/SSO application may query user device 210-N to obtain additional identity information, answers to security questions (e.g., a mother's maiden name, etc.), and/or other identity information (e.g., a legal name, a special code, biometric information, etc.). In another example, the IDM/SSO application may request that the unknown user provide an OpenID® number that the IDM/SSO application may use to verify the identity of the unknown user with respect to the particular application. In one example, the IDM/SSO application may send the OpenID® to a server device that provides identity verification services based on an OpenID® to obtain authentication services regarding the unknown user and/or user device 210-N.

As shown in FIG. 5, if the other identity information does not match the stored identity information (block 525—NO), then process 500 may include sending a notification that the identity of the unknown user cannot be verified (block 530). For example, the IDM/SSO application may obtain, from user device 210-N, other identity information, answers to security questions, etc. associated with the unknown user and may compare the other identity information, associated with the unknown user, to identity information stored in IDM/SSO data structure 600 (FIG. 6A). Based on the comparison, the IDM/SSO application may, for example, determine that the other identity information does not match the identity information stored in IDM/SSO data structure 600 (e.g., shown as ellipses 616-622 of FIG. 6A) and may send a notification to third party server 220 and/or user device 210-N that the identity of the unknown user cannot be verified.

In another example, the IDM/SSO application may receive an indication that the identity of the unknown user and/or user device 210 cannot be verified based on an OpenID®. The indication may be received in response to an OpenID being sent, at a previous point in time, to a server device that provides identity verification services using an OpenID®. Based on the indication, the IDM/SSO application may, for example, send the notification to third party server 220 and/or user device 210-N that the identity of the unknown user cannot be verified.

As further shown in FIG. 5, if the other identity information matches the stored identity information (block 525—YES), or if the received identity information, associated with the unknown user, matches the stored identity information, associated with the unknown user (block 515—YES), then process 500 may include retrieving information associated with network policies and user permissions (block 535). In one example, the IDM/SSO application may determine that the identity information obtained from the token matches identity information that corresponds to a business identity, associated with the unknown user, stored in IDM/SSO data structure 600 (FIG. 6A). In this example the IDM/SSO application may determine that the identity information, obtained from the token, matches the identity information stored in IDM/SSO data structure 600 (e.g., shown by ellipse 620 of FIG. 6A) that includes information associated with the unknown user, such as a name (e.g., Johnathon H. Smith), a service username (e.g., John.Smith), a service password (e.g., orange), a PIN (e.g., 2345), a business address (not shown in FIG. 6A), a business telephone (not shown in FIG. 6A), etc. Additionally, or alternatively, the IDM/SSO application may, for example, determine that the identity information, obtained from the token, matches the information associated with user device 210-N, such as a device identifier associated with a computer device used by the unknown user (e.g., MAC address, IP address, a URL, etc.), and/or a service provider application identifier (e.g., address book) from which services may be obtained by user device 210-N and/or the third party application.

In another example, the IDM/SSO application may determine that other identity information obtained from user device 210-N, as a result of a query sent to user device 210-N, matches identity information stored in IDM/SSO data structure 600 (FIG. 6A). In yet another example, the IDM/SSO application may determine that answers to security questions, received as a result of the query, match answers to security questions stored in IDM/SSO data structure 600 (not shown in FIG. 6A). In still another example, the IDM/SSO application may receive an indication that the identity of the unknown user and/or user device 210 has been verified based on an OpenID®.

Based on the determination that the identity of the unknown user and/or user device 210-N has been verified, the IDM/SSO application may, for example, retrieve information associated with service provider network 260 policies and/or information associated with user (e.g., of user device 210-1) permissions. The information associated with service provider network 260 policies and/or information associated with user permissions may be retrieved from a network policy and user permissions memory (e.g., network policy and user permissions data structure 640 of FIG. 6B).

For example, the IDM/SSO application may use the information associated with service provider network 260 policies and/or information associated with user permissions to determine whether to authorize the third party application to access a particular service provider application (e.g., a calendar application, a location application, an address book application, etc.). If, for example, the IDM/SSO application authorizes the third party application to access the third party application, the IDM/SSO application may send identity information to the third party application that enables the third party application to log in to the particular third party application on behalf of the unknown user.

As illustrated in FIG. 6B, network policy and user permissions data structure 640 (hereinafter referred to as "policy and permission data structure 640") may include a service provider field 606 as described above with respect to FIG. 6A. Additionally, or alternatively, policy and permissions data structure 640 may include a network policy field 645, a user permission field 650, and/or other fields (not shown in FIG. 6B). Policy and permission data structure 640, of FIG. 6B, includes fields 606 and 645-650 for explanatory purposes. In practice, policy and permissions data structure 640, of FIG. 6B, may include additional fields, fewer fields, different fields, and/or differently arranged fields than are described with respect to policy and permissions data structure 640 of FIG. 6B.

Service provider field 606 may include information associated with a service provider application (e.g., hosted by application server 230), such as a service provider application identifier (e.g., an app ID, such as a calendar, a location, an address book, and/or other app ID) from which services are to be obtained by the third party application on behalf of the unknown user. Policy field 645 may include information, associated with service provider network 260 polices, which indicates whether and/or under what conditions identity information may be disclosed and/or access to service provider applications may be authorized. For example, policy field 645 may store information associated with a quantity of times that a service provider application is permitted to be accessed (e.g., by a third party application) over a particular period of time. In another example, policy field 645 may store information that establishes a threshold associated with a quantity of times and/or a type of information that is permitted to be disclosed to the service provider application. Policy field 645 may store, for example, information that establishes a default threshold associated with whether and/or with what accuracy (e.g., granularity) location information (e.g., associated with user device 210-1) may be disclosed to third party application. In yet another example, policy field 645 may store information that establishes whether presence information (e.g., whether user device 210-1 is powered up, in use, in motion, which applications are being used, etc.) and/or information associated with device capabilities (e.g., based on device type, configuration, etc.) can be disclosed to a third party application. In still another example, policy field 645 may store information associated with a duration that the third party application is authorized to access a service provider application.

Permissions field 650 may store information that establishes whether, under what conditions, and/or the manner in which information is authorized, by the user of user device 210-1, to be disclosed to a third party application. For example, permissions field 650 may store information that identifies which service provider applications (e.g., a calendar application, a location application, an address book application, etc.) and/or other users (e.g., user A, user B, the unknown user, etc.) may access information associated with user device 210-1. In another example, permissions field 650 may store information that establishes the days of the week and/or the time of the day that information associated with user device 210-1 can be accessed (e.g., via a service provider application) by the third party application. In yet another example, permission field 650 may include information associated with the type of access (e.g., read only, write, delete, etc.) that the third party application may access the information associated with user device 210-1.

Returning to FIG. 5, if disclosure of identity information is not authorized based on information associated policies or permissions (block 540—NO), then process 500 may include sending a notification that access is not authorized (block 545). For example, IDM/SSO application may determine whether disclosing identity information to the third party application is authorized based on the information stored in policy and permissions data structure 640 of FIG. 6B. For example, the IDM/SSO application may determine that a quantity of times that the third party application is querying a service provider application, such as a calendar application, a location application, an address book application, and/or another service provider application, exceeds a particular threshold (e.g., an access threshold as shown by ellipses 655-665 of FIG. 6B). The IDM/SSO application may, for example, send a notification to the third party application indicating that access to the service provider application is not authorized.

In another example, the IDM/SSO application may determine that only a particular user (e.g., user A as shown by ellipse 655) is authorized access to a service provider application (e.g., a calendar application) and may send a notification to the third party application (e.g., on behalf of the unknown user) denying access to the calendar application. In yet another example, the IDM/SSO application may determine that a particular time that the third party application is querying a particular service provider application (e.g., a location application), to obtain location information associated with user device 210-1, is not within a particular period of time specified by the user (e.g., business hours as shown by ellipse 660 of FIG. 6B). Based on the determination, the IDM/SSO application may send a notification to the third party application denying access to the location application. In still another example, the IDM/SSO application may determine that the user of user device 210-1 has not authorized the third party application to access a particular service provider application, such as an address book application (e.g., shown as "none" via ellipse 665 of FIG. 6B). The IDM/SSO application may, based on the determination, send a notification to the third party application indicating that access to the address book application is not authorized.

As further shown in FIG. 5, if disclosure of identity information is authorized based on information associated policies or permissions (block 540—YES), then process 500 may include retrieving context information (block 550). For example, IDM/SSO application may determine that disclosing identity information to the third party application is authorized based on the information stored in policy and permissions data structure 640 of FIG. 6B. The IDM/SSO application may, for example, determine that a quantity of times that the third party application is querying a service provider application is less than or equal to a particular threshold (e.g., an access threshold as shown by ellipses 655-665 of FIG. 6B). In another example implementation, the IDM/SSO application may determine that the quantity of times that the third party application has queried the service provider application is greater than the access threshold. Based on the determination, the IDM/SSO application may authorize the access and may send a notification to the third party application indicating that additional costs may be incurred based on the determination that the particular threshold is being exceeded.

In another example, the IDM/SSO application may determine that the user (e.g., of user device 210-1) has authorized a particular user (e.g., user A as shown by ellipse 655) to access a particular service provider application (e.g., a calendar application). The IDM/SSO application may, based on the determination, permit the third party application to access the calendar application when the IDM/SSO application determines that the unknown user is user A. In yet another example, the IDM/SSO application may permit the third party application to access the particular service application (e.g., the location application) based on a determination that a particular point in time that the third party application is querying the location application is within a particular period of time authorized by the user (e.g., business hours as shown as ellipse 660 of FIG. 6B).

Based on the determination that the third party application is authorized to access a service provider application (e.g., a calendar application, a location application, an address book application and/or another service provider application), the IDM/SSO application may retrieve context information, associated with user device 210-N and/or the unknown user, from a context memory associated with IDM/SSO application 250 (e.g., context data structure 670 of FIG. 6C).

As illustrated in FIG. 6C, context data structure 670 may include device identifier field 604, as described above with respect to FIG. 6A, and/or a context field 675. Context data structure 670, of FIG. 6C, includes fields 604 and 675 for explanatory purposes. In practice, context data structure 670, of FIG. 6C, may include additional fields, fewer fields, different fields, and/or differently arranged fields than are described with respect to context data structure 670 of FIG. 6C.

Context field 670 may include context information associated with user device 210-N obtained from an IDM/SSO session, associated with user device 210-N, at a prior point in time. In one example, context field 670 may store information regarding a location associated with a user device 210-N obtained during the prior session. In another example, context field 670 may store information regarding a type, configuration, and/or capabilities of user device 210-N used during the prior session. In yet another example, context field 670 may store information associated usage patterns (e.g., particular service provider applications used during a prior session) associated with user device 210-N.

In another example implementation, the IDM/SSO application may communicate with a server device associated with another network (e.g., network 270 and/or another service provider network 260), to obtain context information, from a prior point in time, associated with user device 210-N.

Returning to FIG. 5, if disclosure of identity information is not authorized based on context information (block 555—NO), then process 500 may include sending a notification that access is not authorized (block 545). For example, the IDM/SSO application may compare context information associated with user device 210-N, obtained from the token, with context information retrieved from the context memory. In this example, the IDM/SSO application may use a device identifier associated with user device 210-N (e.g., a CODEC number and/or an STB identifier when user device 210-N is, for example, an STB) and may retrieve context information corresponding to the device identifier (e.g., location Y 695 of FIG. 6C). The IDM/SSO application may compare the retrieved context information with context information obtained from the token and may send a notification to the third party application indicating that access to a particular service provider application is not authorized based on the determination that the location information obtained from the token does not match the location information retrieved from context data structure 670 of FIG. 6C.

In another example, the IDM/SSO application may use a device identifier associated with user device 210-N (e.g., IMSI, MSISDN, MDN, etc. when user device 210-N is, for example, a wireless mobile device) and may retrieve context information corresponding to the device identifier (e.g., usage pattern 680 of FIG. 6C). The IDM/SSO application may determine that the service provider applications, used during the current session, do not match service provider applications (e.g., associated with usage pattern 680) retrieved from context data structure 670 of FIG. 6C. The IDM/SSO application may, as a result of the determination, send a notification to the third party application indicating that access to a particular service provider application is not authorized.

In yet another example, the IDM/SSO application may use a device identifier associated with user device 210-N (e.g., MAC address, IP address, etc. when user device 210-N is, for example, a computer device) and may retrieve context information corresponding to the device identifier (e.g., device capabilities 690 of FIG. 6C). The IDM/SSO application may determinate that the device capabilities, retrieved from context data structure 670, do not match the user device 210-N capabilities obtained from the token and/or as a result of querying user device 210-N. The IDM/SSO application may, as a result of the determination, send a notification to the third party application indicating that access to a particular service provider application is not authorized.

In another example implementation, the IDM/SSO application may, in a manner similar to that described above (e.g., with respect to block 520) send a query to user device 210-N to obtain additional identity information. For example, the IDM/SSO application may determine that no context information associated with user device 210-N is stored in context data structure 670 (e.g., shown as indication 685 of FIG. 6C). Based on the determination, the IDM/SSO application may, for example, send a query to user device 210-N to obtain additional identification information with which to verify the identity of the unknown user. In another example, the IDM/SSO application may determine that context information associated with user device 210-N (e.g., location information, device capabilities, etc.) cannot be obtained from the token and may query user device 210-N to obtain context information associated with the current session. In yet another example, the IDM/SSO application may, in a manner similar to that described above (e.g., with respect to block 520), query user device 210-N for an OpenID®, with which to verify the identity of the unknown user.

As still further shown in FIG. 5, if disclosure of identity information is authorized based on context information (block 555—YES), then process 500 may include sending identity information to the third party application (block 560). For example, the IDM/SSO application may determine that location information associated with user device 210, retrieved from the token and/or as a result of querying user device 210, matches location information (e.g., location Y 695 of FIG. 6C) retrieved from context data structure 670 (FIG. 6C). In another example, the IDM/SSO application may determine that the service provider applications, used during the current session, match information associated with usage pattern 680 retrieved from context data structure 670 of FIG. 6C. In yet another example, the IDM/SSO application may determinate that the device capabilities, retrieved from context data structure 670, match the user device 210-N capabilities obtained from the token and/or as a result of querying user device 210-N. The IDM/SSO application may, as a result of the determination, authorize the third party application to access particular service provider applications. The IDM/SSO application may, as a result of the determination, authorize the third party application to access particular service provider applications (e.g., a calendar application, a location application, an address book application, and/or another service provider application).

As a result of the authorization for the third party application to access the particular service provider applications, the IDM/SSO application may, for example, send identity information to the third party application. The identity information may, in a manner similar to that described above (e.g., with respect to IDM/SSO data structure 600 of FIG. 6A), include information associated with the unknown user and/or user device 210-N for each service provider application identified in the token (e.g., or as a result of the registration process described above with respect to FIG. 4). The third party application may receive the identity information and may use the login credentials, obtained from the identity information, to log in to the service provider applications (e.g., hosted by application server 230), on behalf of the unknown user, to receive services.

In another example implementation, the identity information may be stored in a token that the IDM/SSO application may send to the third party application for use in accessing services from the service provider applications. In one example, the IDM/SSO application may store a time-to-live (TTL) entry in the token that establishes a period of time after which the third party application may no longer be authorized access to the service provider applications. In another example, the IDM/SSO application may establish a TTL that is based on a permission specified by the user of user device 210-1 and which may be stored in policy and permission data structure 640 of FIG. 6A.

In another example implementation, the IDM/SSO application may use the identity information as an implicit registration of the unknown user and/or user device 210-N. In this example, the IDM/SSO application may store the verified identity information and/or context information, as registration information, in a memory associated with a home subscriber server (HSS) and/or another service device associated with the service provider network 260. For example, at a future point in time, when the third party application sends a token to the IDM/SSO application to establish another session on behalf of the unknown user, the IDM/SSO application may communicate with the HSS to expedite the identity verification and/or authorization for the third party application to access the service provider application.

In another example implementation, the IDM/SSO application may perform another identity verification operation for a service provider application. For example, IDM/SSO server 250 receive a query from a particular service provider application (e.g., hosted by application server 230-M) for additional identification information associated with user device 210-N. In one example, the IDM/SSO application may, in a manner similar to that described above (e.g., with respect to block 520), use an OpenID®, associated with user device 210-N to receive additional identity verification information in response to the query. In another example, the IDM/SSO application may query user device 210-N to obtain additional identification information in response to the query.

In yet another example, the IDM/SSO application may receive, from a service provider application, a request (e.g., that includes an OAuth® request token) to obtain additional identification information associated with the unknown user (e.g., in response to the third party application login request). The IDM/SSO application may receive the request and may authorize the request token by entering login credentials on behalf of the third party application and/or the unknown user (e.g., such login credentials associated with the unknown user, an OpenID associated with the unknown user, etc.). The IDM/SSO application may receive another request (e.g., that includes an OAuth® content access token) to confirm access to an additional identity associated with the unknown user. The IDM/SSO application may authorize the content access token and/or may send additional identity information (e.g., an OAuth identity and/or other identity information) associated with the unknown user.

Implementations described herein may include systems and/or methods that provide for IDM and/or SSO in a heterogeneous composite service scenario. In one example implementation, an IDM/SSO application may register a third party application. For example, the IDM/SSO application may receive a registration request from a third party application, may register the third party application, and/or may send login credentials to the third party application to be used in an IDM/SSO session with a third party application.

In another example implementation, an IDM/SSO application may provide IDM services to the registered third party application that include verifying the identity of an unknown user (e.g., of a user device) associated with a third party application. For example, the IDM/SSO application may receive a request (e.g., that includes a token) for IDM services from a third party application to verify an identity associated with the unknown user with which the third party application is associated. The IDM/SSO application may receive the request and may use identity information, obtained from the token, to retrieve, from a memory, other identity information, permission information, policy information, and/or context information. The IDM/SSO application may use the retrieved other identity information, permission information, policy information, and/or context information to verify the identity of the unknown user and/or to authorize the release of identity information.

In yet another example implementation, the IDM application may provide SSO services to a third party application. For example, IDM/SSO application may retrieve identify information and/or login credentials (e.g., associated with the unknown user, and/or the user device) for each service provider application from which services are to be received. The IDM/SSO application may send the login credentials to the third party application that enables the third party application to login to the service provider applications on behalf of the unknown user. The third party application may use the services, obtained from the service provider applications, to provide a composite service to the unknown user via the user device.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 5 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor that executes software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a first server device, the method comprising:
    receiving, by the first server device and from a second server device that hosts a third party application, a first request to verify an identity of a user of a user device associated with the third party application,
        the first request including a token containing identity information of the user and information regarding two or more service provider applications from which services are to be obtained by the third party application on behalf of the user;
    determining, by the first server device, whether the identity information, of the user, matches stored identity information stored in a memory of the server device;
    retrieving, by the first server device and from the memory, context information of the user device, when the identity information matches the stored identity information, the context information including location information, that identifies a first location of the user device during a prior session to verify the identity of the user;
    comparing, by the first server device, a second location of the user device, at a present point in time, with the first location of the user device;
    retrieving, by the first server device and from the memory, the identity information when the second location of the user device matches the first location of the user device; and
    sending, by the first server device and to the second server device, the identity information, where the identity information includes login credentials, of the user, said login credentials permitting the third party application to access the two or more service provider applications on behalf of the user.

2. The method of claim 1, further comprising:
    receiving, from a third server device, a second request to verify the identity of the user, the third server device hosting one or more service provider applications, of the two or more service provider applications;

sending, to a fourth server device and based on the second request, other identity information of the user, the fourth server device being part of an identity verification service;

receiving, from the fourth server device, a notification verifying the identity of the user based on the other identity information of the user; and sending, to the third server device, another notification verifying the identity of the user.

3. The method of claim 2, where the other identity information is an OpenID and the identity verification service is based on an OpenID decentralized authentication standard.

4. The method of claim 1, further comprising:
receiving, from a third server device, a second request to verify the identity of the user, the third server device hosting one or more service provider applications of the two or more service provider applications;
sending, based on the second request, a query to the user device requesting other identity information of the user;
receiving, from the user device, the other identity information;
determining whether the other identity information matches the identity information stored in the memory; and
sending, to the third server device, a notification verifying the identity of the user when the other identity information matches the identity information.

5. The method of claim 1, further comprising:
retrieving, from the memory, policy information that includes conditions under which the third party application is authorized to access the two or more service provider applications; and
authorizing the identity information to be sent to the third party application when the conditions have been satisfied.

6. The method of claim 5, where the conditions include an access threshold that establishes a quantity of times that the third party application is authorized to access the two or more service provider applications over a particular period of time; and
where authorizing the identity information to be sent to the third party application includes:
determining that the quantity of times that the third party application has accessed the two or more service provider applications is less than or equal to the access threshold.

7. The method of claim 5, where the conditions include an access threshold that establishes a quantity of times that the third party application is authorized to access the two or more service provider applications over a particular period of time; and
where authorizing the identity information to be sent to the third party application includes:
determining whether the quantity of times that the third party application has accessed the two or more service provider applications is greater than the access threshold; and
sending a notification to the third party application indicating that additional costs will be incurred when the quantity of times that the third party application has accessed the two or more service provider applications is greater than the access threshold.

8. The method of claim 1, further comprising:
retrieving, from the memory, permission information that establishes a manner in which the third party application is authorized to access the two or more service provider applications; and authorizing the identity information to be sent to the third party application when the identity information is sent in the manner authorized.

9. The method of claim 8, where the permission information indicates that the other user has authorized the two or more service provider applications to be accessed during business hours; and
where authorizing the identity information to be sent to the third party application includes:
determining that the third party application is to access the two or more service provider applications during the business hours.

10. A first server device, comprising:
a memory to store identity information for a plurality of users, policy information for the server device, and particular context information of a plurality of user devices, and
a processor to execute instructions in the memory to:
receive, from a second server device that hosts a third party application, a request to receive login credentials of a user of a user device, where the login credentials enable the third party application to access at least two service provider applications on behalf of the user, the request including a token containing identity information for the user and context information that includes capabilities of the user device,
perform an identity verification operation to determine whether particular identity information, for the user, is stored in the memory, the particular identity information including the login credentials,
perform an authorization operation to determine whether the context information, matches the particular context information stored in the memory or whether the policy information permits the disclosure of the particular identity information, and
send the particular identity information to the second server device to be used by the third party application to access the two or more service provider applications, on behalf of the user, when the identity of the user is verified as a result of the identity verification operation and when the disclosure of the particular identity information is permitted as a result of the authorization operation.

11. The first server device of claim 10, where, when performing the identity verification operation, the processor is further to:
determine whether the identity information for the user matches the particular identity information, and
when the identity information matches the particular identity information:
verify the identity of the user, and when the identity information does not match the particular identity information:
query the user device to obtain other identity information with which to verify the identity of the user.

12. The first server device of claim 10, where, when performing the authorization operation, the processor is further to:
compare particular capabilities of the user device, at a prior point in time and obtained from the particular context information, with the capabilities of the user device obtained from the token, and
authorize the disclosure of the particular identity information when the particular capabilities of the user device match the capabilities of the user device.

13. The first server device of claim 10, where, when performing the authorization operation, the processor is further to:

retrieve, from the memory,
the particular context information of the user device, the particular context information including usage patterns, associated with
service provider applications, from a prior point in time,
determine whether the service provider applications, accessed by the third party application at the prior point in time, are same as the two or more service provider applications, and
authorize the disclosure of the particular identity information when the service provider applications are same as the two or more service provider applications.

14. The first server device of claim 10, where, when performing the authorization operation, the processor is further to:
retrieve, from the memory, the policy information, and
determine, from the policy information, that the third party application is authorized for read only access to the two or more service provider applications.

15. The first server device of claim 10, where the particular identity information sent to the second server device includes a token; and
where the processor is further to:
store a time-to-live quantity in the token that establishes a period of time after which the third party application is no longer authorized to access the two or more service provider applications.

16. The first server device of claim 10, where the processor is further to:
receive, from a third server device, a request for content access to obtain other identity information for the user that includes a first token associated with a content access protocol,
the third server device hosting one of the two or more service provider applications,
authorize the first token associated with the content access protocol, on behalf of the third server device, using a login credential of the user,
receive a second token, from the third server device, to confirm content access, the second token being associated with the content access protocol,
authorize the second token on behalf of the second server device, and
send, to the third server device, the other identity information of the user.

17. The first server device of claim 16, where the login credential of the user is an OpenID and the content access protocol is based on an OAuth protocol.

18. The first server device of claim 10, where the processor is further to:
determine that a quantity of times that the third party application has accessed the two or more service application providers, on behalf of the user, is greater than a threshold, and
perform an operation to implicitly register the third party application to expedite the identity verification operation or the authorization operation, at a future point in time,
where, when performing the operation to implicitly register the third party application on behalf of the user, the processor is to:
store the particular identity information or information contained in the token when the quantity of times that the third party application has accessed the two or more service application providers, on behalf of the user, is greater than the threshold.

19. A system comprising:
a storage device to store:
identity information of a user of a user device, the identity information including a plurality of identity entries of the user, and
context information that identifies a location of the user device or capabilities of the user device at a prior point in time; and a first server device to:
receive, from a second server device that hosts a third party application, a first request to verify an identity of the user with which the third party application is associated,
the first request including one or more identity entries,
determine whether the one or more identity entries match at least one identity entry of the plurality of identity entries,
retrieve, from the storage device, the plurality of identity entries when the one or more identity entries match the at least one identity entry,
the plurality of identity entries including login credentials for at least one service provider application from which services are to be obtained by the third party application,
retrieve, from the storage device, the context information when the one or more identity entries match the at least one identity entry,
compare particular context information, associated with the user device at a present point in time, with the retrieved context information to determine whether the particular context information matches the retrieved context information, and
send, to the second server device, the login credentials for the at least one service provider application when the particular context information matches the retrieved context information.

20. The system of claim 19, where the first server device is to:
receive, from a third server device, a second request to verify the identity of the user,
the third server device hosting a particular service provider application;
send, to the user device and based on the second request, a query to obtain one or more other identity entries of the user;
receive, from the user device, the one or more other identity entries;
determine whether the one or more other identity entries match at least one other identity entry, of the plurality of identity entries, stored in the storage device; and
send, to the first server device, a notification verifying the identity of the user when the one or more other identity entries match the at least one other identity entry.

21. The system of claim 19, where, when comparing the particular context information with the retrieved context information, the first server device is further to:
send, to the user device, a query to obtain the particular context information, and
receive, from the user device, the particular context information.

22. The system of claim 19, where, when comparing the particular context information with the retrieved context information, the first server device is to:
compare the capabilities of the user device, at the prior point in time, with information associated with capabilities of the user device specified in the request, and
permit the login credentials to be sent to the third party application when the capabilities of the user device, at the prior point in time, match the capabilities of the user device specified in the request.

23. The system of claim 19, where the first server device is further to:
retrieve, from the storage device, policy information associated with the first server device that includes conditions under which the third party application is permitted to access the at least one service provider application, and permit the login credentials to be sent to the third party application when the conditions have been satisfied.

24. The system of claim 19, where the first server device is further to:
retrieve, from the storage device, permission information that establishes a manner in which the third party application is permitted, by another user of another user device, to access the at least one service provider application to obtain information associated with the other user device, and permit the login credentials to be sent to the third party application when the login credentials are sent in the manner permitted by the other user.

\* \* \* \* \*